United States Patent
Ding et al.

(10) Patent No.: US 12,505,288 B1
(45) Date of Patent: Dec. 23, 2025

(54) MULTI-MACHINE LEARNING SYSTEM FOR INTERACTING WITH A LARGE LANGUAGE MODEL

(71) Applicant: Amazon Technologies, Inc., Seattle, WA (US)

(72) Inventors: Haibo Ding, Fremont, CA (US); Panpan Xu, Santa Clara, CA (US); Huan Song, San Jose, CA (US); James Robert Golden, Oakland, CA (US); Yawei Wang, Santa Clara, CA (US); Lin Lee Cheong, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 98 days.

(21) Appl. No.: 18/536,917

(22) Filed: Dec. 12, 2023

(51) Int. Cl.
*G10L 15/183* (2013.01)
*G06F 40/20* (2020.01)

(52) U.S. Cl.
CPC ................................ *G06F 40/20* (2020.01)

(58) Field of Classification Search
CPC ........ G06N 5/022; G06F 40/284; G06F 40/30
See application file for complete search history.

(56) References Cited

U.S. PATENT DOCUMENTS 6,266,664 B1 * 7/2001 Russell-Falla ...... G06F 16/9535
707/999.005
8,447,602 B2 * 5/2013 Bartosik ............... G06F 40/232
704/235
9,619,735 B1 * 4/2017 Lineback ................. G06N 3/08
10,565,498 B1 * 2/2020 Zhiyanov ............... G06N 3/045
10,853,579 B2 * 12/2020 Laxman .................. G06F 40/30
(Continued)

FOREIGN PATENT DOCUMENTS

AU 2011255614 A1 * 11/2012 ....... G06F 16/24578
AU 2014233517 A1 * 9/2015 ............ G10L 15/22
(Continued)

OTHER PUBLICATIONS

Du et al., "Template Filling with Generative Transformers", Proceedings of the 2021 Conference of the North American Chapter of the Association for Computational Linguistics: Human Language Technologies, Jun. 6-11, 2021, pp. 909-914.
(Continued)

*Primary Examiner* — Mohammad K Islam
(74) *Attorney, Agent, or Firm* — Kilpatrick Townsend & Stockton LLP

(57) ABSTRACT

Techniques disclosed may include determining a first prompt that is generated at a user interface of a user device and that is to be input to a first machine learning (ML) model. The techniques may further include determining, based at least in part on a second ML model, a classification of the first prompt. The techniques may further include generating, based at least in part on an input to a third ML model associated with the classification, a second prompt, the input being based at least in part the first prompt, an output of the third ML model comprising the second prompt. The techniques may further include performing at least one of: (i) inputting the second prompt instead of the first prompt to the first ML model, or (ii) causing the second prompt to be presented at the user interface.

18 Claims, 9 Drawing Sheets

(56) References Cited

U.S. PATENT DOCUMENTS

| | | | |
|---|---|---|---|
| 10,878,174 B1* | 12/2020 | Vontobel | G06Q 10/06398 |
| 11,106,690 B1* | 8/2021 | Dhillon | G06N 5/01 |
| 11,481,434 B1* | 10/2022 | Venti | G06F 40/30 |
| 11,532,301 B1* | 12/2022 | Hajebi | G06F 40/35 |
| 2003/0115191 A1* | 6/2003 | Copperman | G06F 16/90332 |
| | | | 707/E17.139 |
| 2012/0215776 A1* | 8/2012 | Guha | G06F 16/951 |
| | | | 707/E17.064 |
| 2015/0278341 A1* | 10/2015 | Shen | G06F 16/9538 |
| | | | 707/730 |
| 2016/0323398 A1* | 11/2016 | Guo | H04L 67/535 |
| 2017/0127016 A1* | 5/2017 | Yu | G06N 3/084 |
| 2017/0323636 A1* | 11/2017 | Xiao | G06N 3/044 |
| 2018/0077101 A1* | 3/2018 | Desouza Sana | G06Q 10/107 |
| 2019/0108228 A1* | 4/2019 | Zeng | G06F 16/24522 |
| 2020/0118544 A1* | 4/2020 | Lee | G10L 15/063 |
| 2020/0356653 A1* | 11/2020 | Cho | G06N 3/084 |
| 2021/0201351 A1* | 7/2021 | Nag | G06F 16/24534 |
| 2022/0366901 A1* | 11/2022 | Rathaur | G06F 16/245 |
| 2023/0134791 A1* | 5/2023 | Londeree | G06F 16/93 |
| | | | 706/50 |
| 2025/0086213 A1* | 3/2025 | Dilipkumar | G06F 16/24522 |

FOREIGN PATENT DOCUMENTS

| | | | | |
|---|---|---|---|---|
| AU | 2015210460 A1 * | 9/2015 | | G10L 15/183 |
| CN | 110998565 A * | 4/2020 | | G06N 3/08 |
| EP | 3514694 B1 * | 12/2022 | | G06F 40/253 |
| EP | 4312147 A2 * | 1/2024 | | G10L 15/197 |
| WO | WO-2013157603 A1 * | 10/2013 | | G06F 16/955 |
| WO | WO-2015039165 A1 * | 3/2015 | | G06F 16/24578 |
| WO | WO-2017160341 A1 * | 9/2017 | | G10L 15/22 |
| WO | WO-2021119064 A1 * | 6/2021 | | H04L 51/42 |
| WO | WO-2023017320 A1 * | 2/2023 | | G10L 15/22 |

OTHER PUBLICATIONS

Hao et al., "Optimizing Prompts for Text-to-Image Generation", Available online at: https://arxiv.org/pdf/2212.09611, Dec. 29, 2023, pp. 1-16.

Li , "Guiding Large Language Models via Directional Stimulus Prompting", Available online at: https://arxiv.org/pdf/2302.11520, Oct. 9, 2023, pp. 1-27.

* cited by examiner

MULTI-MACHINE LEARNING SYSTEM FOR INTERACTING WITH A LARGE LANGUAGE MODEL

BACKGROUND

Different types of devices can be configured to perform different functionalities. A set of servers can be configured to provide a large language model (LLM). A user device can interact with the server over a data network to send a prompt to the LLM and receive a response back from the LLM. The effectiveness (e.g., accuracy, quality) of the response can depend on the prompt (e.g., form, format, content).

BRIEF DESCRIPTION OF THE DRAWINGS

Various embodiments in accordance with the present disclosure will be described with reference to the drawings, in which.

DETAILED DESCRIPTION

Figure 1:
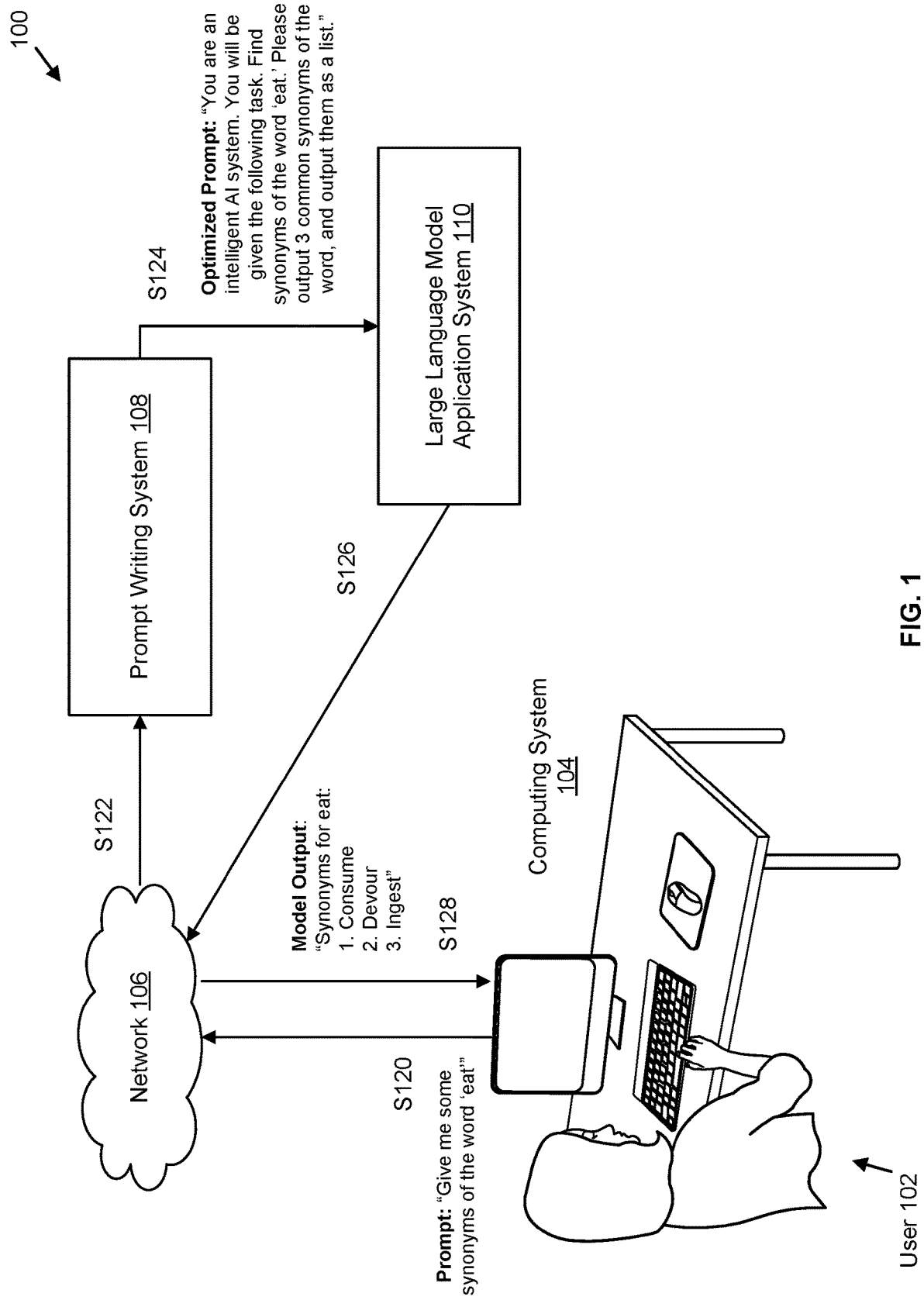
FIG. 1 illustrates an example of a prompt improvement system, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure relate to techniques using a multi-machine learning system. The embodiments include techniques for using prompt writing models to generate effective prompts.

Machine learning (ML) models capable of generating output based on prompts have many capabilities. However, the effectiveness of such prompt-based ML models is limited by the prompts used with the ML models. Improvements can be made (e.g., for more effective ML model use) by improving the prompts. One way to improve the prompts is to use the described multi-ML system that changes an input destined to the ML model, improving the input by leveraging the trained knowledge of the multi-ML system over a large corpus of inputs to the multi-ML system and outputs of the multi-ML system.

Certain embodiments include techniques for using the multi-ML system. The techniques may include determining a first prompt that is generated at a user interface of a user device and that is to be input to a first machine learning (ML) model. The techniques may further include determining, based at least in part on a second ML model, a classification of the first prompt. The techniques may further include generating, based at least in part on an input to a third ML model associated with the classification, a second prompt, the input being based at least in part the first prompt, an output of the third ML model comprising the second prompt. The techniques may further include performing at least one of: (i) inputting the second prompt instead of the first prompt to the first ML model, or (ii) causing the second prompt to be presented at the user interface.

Techniques described herein may allow for an original prompt to be improved using a prompt writing model before the improved prompt is used with an ML model. Use of the improved prompt with the ML model may result in output being obtained that is more effective than the output that would have otherwise been obtained if using the original prompt as input to the ML model.

The multi-machine learning (ML) system may receive a first prompt as input and generate a second prompt as output based at least on the first prompt. The second prompt may then be considered to be improved for use as input to a machine learning model compared to the first prompt. The second prompt may be written to obtain high quality results compared to the first prompt. The quality of results may be measured by content of the results (e.g., phrases, words, accuracy), the format of the results (e.g., list, punctuation), and form of the results (e.g., image, table, text). The quality of results may also be measured using user-provided result preference indicators.

The second prompt may be generated based at least on the machine learning model the second prompt is to be used with, the first prompt, a task-specific prompt writing model, a general prompt writing model, and/or preconfigured templates.

The multi-ML system may be capable of receiving the first prompt (e.g., from a user device) to be input to the machine learning model (e.g., a large language model (LLM)). The first prompt may be used to predict a prompt classification (e.g., classification task, summarization task, math reasoning task, etc.) of the first prompt. Based on the classification, a second machine learning model may be selected from a plurality of machine learning models to generate the second (e.g., optimized/improved) prompt. The second machine learning model may be configured to generate the second prompt in a manner specific to the predicted prompt classification of the first prompt.

In certain embodiments, when the predicted first prompt classification is a first classification, a task-specific prompt writing model is used with the first prompt. The task-specific prompt writing model may be configured to rewrite the first prompt based at least in part on a template that corresponds to the first classification and the first prompt. The template may have been preconfigured for use with prompts predicted as having the first classification. The templates may be configured to facilitate the generation of the second prompt to be input to the first ML model. A template and the first prompt may be used by the task-specific ML model to generate the second prompt for use with the first ML model.

In certain embodiments, when the predicted first prompt classification is a second classification, a general prompt writing model is used. The general prompt writing model may be configured to rewrite the first prompt using the first prompt as input to the general prompt writing model and output the rewritten prompt as the second prompt. The second prompt may then be used with the first ML model to generate output.

The second prompt may be used with the first ML model and cause the first ML model to generate an output result. The output result may then be displayed to a user and/or transmitted to a system component.

In certain embodiments, the multi-ML system runs on a user device or remote to the user device. In certain embodiments, the multi-ML system runs on the same or a separate system from the first ML model. In certain embodiments, the second prompt is transmitted to the user device before it is transmitted to the first ML model.

The embodiments provide for various improvements. For example, the improvements can include increased result accuracy, clarity, formatting, and form. In certain embodiments, the generated prompts can be used as training data for a ML model and thereby cause for the increased performance of the ML model. Further benefits may include improving the efficiency of interaction with a ML model and rely on less computation resources to be used for interactions with the ML model. In other words, rather than needing to send multiple prompts (using network resources) and process multiple prompts (using server resources) to achieve a targeted result, a prompt can be re-written once (or some small number of times) and sent and processed once (or the small number of times), thereby saving network resources and server resources. By writing prompts, certain embodiments may be capable of mitigating bias in the model's responses.

FIG. 1 illustrates an example of a prompt improvement system 100, according to embodiments of the present disclosure;

The prompt improvement system 100 may include a computing system 104, a network 106, a prompt writing system 108, and a large language model application system 110.

The computing system 104 may be a user device (e.g., laptops, personal computers, phones, etc.). The computing system 104 may be a server. The computing system 104 may be capable of receiving input from a user 102 via, for example, a user interface. In certain embodiments, the input received by the computing system 104 includes a first prompt (e.g., a prompt for use with a ML model (e.g., a LLM)) or indicates the selection of a first prompt (e.g., a file selection). The input may cause the computing system 104 to transmit the first prompt to the prompt writing system 108. The prompt may include characteristics such as form (e.g., text, image, file, etc.), format (e.g., list, table, spacing, text color, text style, font style), and content (e.g., question, context, numbers). The prompt may be a text prompt, a text/image prompt, a text/video prompt, a text/file prompt, an audio prompt, etc.

As an example of how a prompt (e.g., non-text audio prompt) may be used, an audio prompt may include audio data. The audio data may be transcribed by the computing system 104 into text and sent to the prompt writing system 108. In another example, the audio data may be sent to the prompt writing system 108, the prompt writing system 108 may then transcribe the audio data into text.

The network 106 may be configured to connect the computing system 104 and the prompt writing system 108 and/or the computing system 104 and the large language model application system 110, as illustrated. In certain embodiments, the network 106 may be configured as a connection between the prompt writing system 108 and the large language model application system 110. The network 106 may be configured to connect any combination of the system components. In certain embodiments, the network 106 is not part of the prompt improvement system 100. For example, the prompt writing system 108 and the large language model application system 110 may run locally on the computing system 104.

Each of the network 106 data connections can be implemented over a public (e.g., the internet) or private network (e.g., an intranet), whereby an access point, a router, and/or another network node can communicatively couple the computing system 104, the prompt writing system 108, and/or the large language model application system 110. A data connection between the components can be a wired data connection (e.g., a universal serial bus (USB) connector), or a wireless connection (e.g., a radio-frequency-based connection). Data connections may also be made through the use of a mesh network. A data connection may also provide a power connection. A power connection can supply power to the connected component. The data connection can provide for data moving to and from system components. One having ordinary skill in the art would recognize that devices may be communicatively coupled through the use of a network (e.g., a local area network (LAN), wide area network (WAN), etc.). Further devices may be communicatively coupled through a combination of wired and wireless means (e.g., wireless connection to a router than is connected via an ethernet cable to a server).

The interfaces between the components communicatively coupled with the prompt improvement system 100, as well as interfaces between the components within the prompt improvement system 100, can be implemented using web interfaces and/or application programming interfaces (APIs). For example, the computing system 104 can implement a set of APIs for communications with the prompt writing system 108, the large language model application system 110, and/or user interfaces of the computing system 104.

The prompt writing system 108 may receive the first prompt from the computing system 104. As discussed above, in certain embodiments, the first prompt is received via the network 106. The prompt writing system 108 may be configured to generate a second prompt based on the first prompt received from the computing system 104. The second prompt may be generated based at least on the large language model application system 110, a classification of the first prompt, the received first prompt, and/or a template. The prompt writing system 108 may be configured to transmit the second prompt to the large language model application system 110 (e.g., via the network 106). In certain embodiments, the prompt writing system 108 may be configured to transmit the second prompt to the computing system 104 before the computing system 104 and/or the prompt writing system 108 transmits the second prompt to the large language model application system 110. The second prompt may be different than the first prompt. The second prompt may be different in form, format, and/or content than the first prompt. Nonetheless, the second prompt can be used in lieu of the first prompt as an input to the large language model application system 110, whereby the output of the large language model application system 110 corresponding to the second prompt has a higher quality than that corresponding to using the first prompt as the input.

The large language model application system 110 may be configured to receive a prompt (e.g., the second prompt, the first prompt) and generate an output result based on the received prompt. The large language model application system 110 may include a first modality-to-second modality model. The first modality may be the same or different as the second modality (e.g., a text-to-text model, a text-to-image model, a text/image-to-text model, a text-to-video model-a text/file-to-text model, an audio-to-text, audio-to-image, an audio-to-audio, a text-to-audio, an image-to-audio, etc.). The first and/or second modality may be text, image, audio, video, etc. The large language model application system 110 may include one or more generative models.

The large language model application system 110 may generate an output. In an example, the large language model application system 110 implements one or more generative artificial intelligence (AI) models that generate new content based on the input (e.g., the first prompt or the second prompt). The content of the output may include translations, summaries, text, numbers, lists, tables, images, multimodal output (e.g., text and images), structured data, etc. The output produced by the large language model application system 110 may be transmitted to the computing system 104 and/or the prompt writing system 108 (e.g., via the network 106).

The prompt improvement system 100 illustrated in FIG. 1 may further implement the illustrated steps S120-S128. The illustrated steps may be implemented by executing instructions stored on a memory of the prompt improvement system 100, where the execution is performed by processors of the prompt improvement system 100.

At step S120, an example prompt is shown. The example prompt is being transmitted from the computing system 104 to the network 106. The example prompt may be text that recites "give me some synonyms for the word eat." The prompt may have been received by the computing system 104 (e.g., from a user interface) so that the computing system 104 could use the prompt in the process of obtaining output from the large language model application system 110.

At step S122, the example prompt continues to be transmitted to the prompt writing system 108 from the computing system 104 via the network 106.

At step S124, after the prompt writing system 108 receives the example prompt, the prompt writing system 108 may generate an example second prompt and transmit the example second prompt to the large language model application system 110. The example second prompt may be different from the first prompt. The example second prompt (the optimized/improved prompt) recites "you are an intelligent AI system. You will be given the following task. Find synonyms of the word 'eat.' Please output 3 common synonyms of the word, and output them as a list."

The large language model application system 110 may receive the example second prompt and use the example second prompt to generate an output. The output may recite "Synonyms for eat: 1. Consume 2. Devour 3. Ingest."

At step S126, the output may be transmitted from the large language model application system 110 to the network 106. In certain embodiments, the output is transmitted from the large language model application system 110 to the prompt writing system 108 before the prompt writing system 108 then transmits the output to the computing system 104 (e.g., via the network 106).

At step S128, the output may be transmitted from the network 106 to the computing system 104.

In certain embodiments, after step S122 is performed, the prompt writing system 100 may transmit the second example prompt to the computing system 104 (e.g., via the network 106) and cause the computing system 104 to transmit (e.g., via the network 106) the second example prompt to the large language model application system 100. The large language model application system may then transmit a second output to the computing system (e.g., via the network 106).

Figure 2:
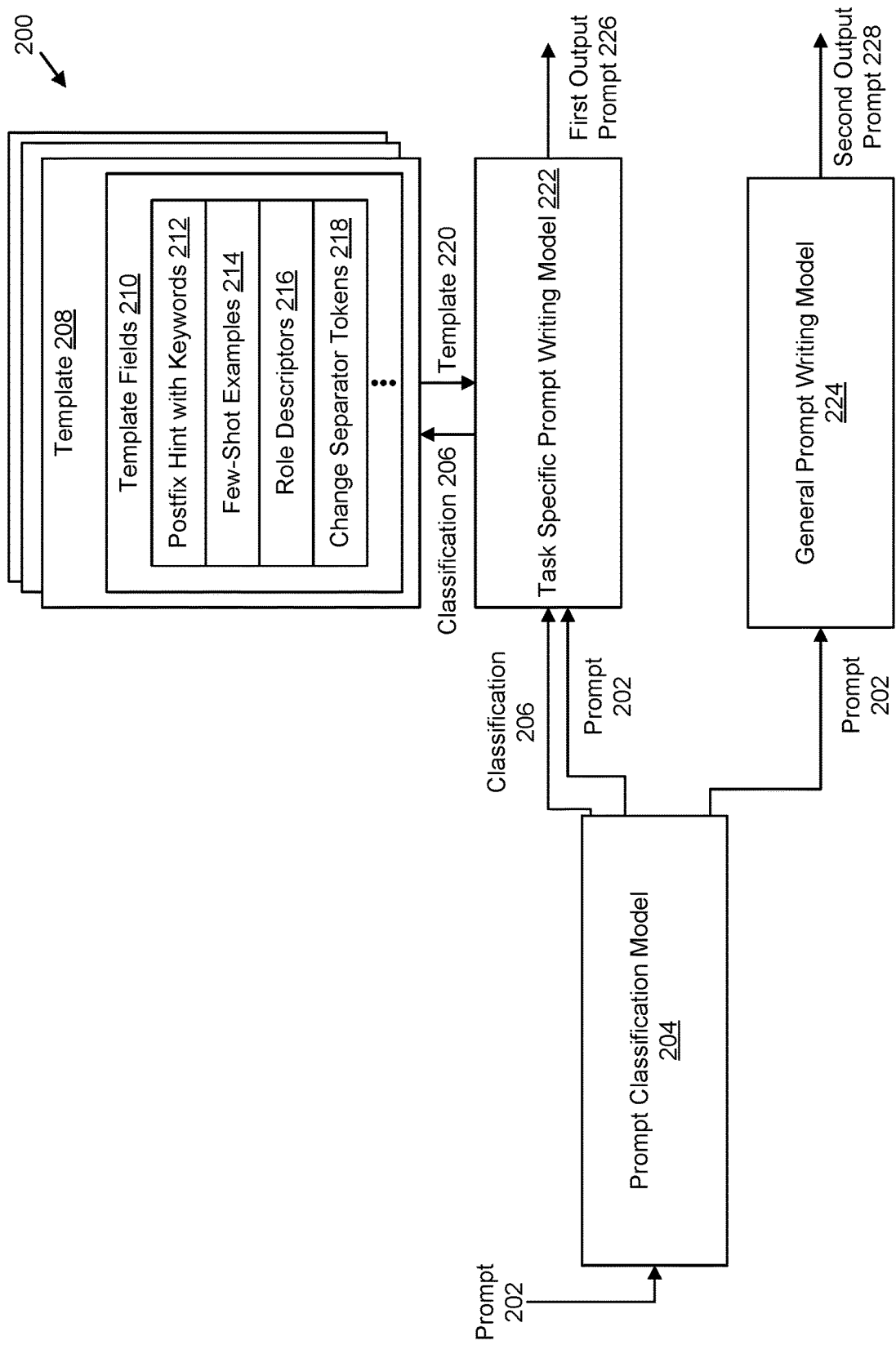
FIG. 2 illustrates an example of a prompt writing system, according to embodiments of the present disclosure.

FIG. 2 illustrates an example of a prompt writing system 200, according to embodiments of the present disclosure.

The prompt writing system 200 may include a prompt classification model 204, a general prompt writing model 224, a task specific prompt writing model 222, and a set of one or more templates 208.

The prompt classification model 204 may be a ML model (e.g., a classifier). The ML model may be configured to output a determined classification 206 of an input prompt 202. The input prompt 202 may be received from a user device or another system. The input prompt 202 may be represented in a form, have a format, and have content.

The prompt classification model 204 may determine which classification an input prompt 202 is from a pre-defined set of classifications (e.g., text classification, summarization, question answering, code generation, math reasoning, image generation, document creation, creative, technical, other). The prompt classification model 204 may be capable of classifying text prompts, image prompts, video prompts, file prompts, table prompts, etc. As an illustrative example, a text prompt may recite "please summarize the following for me: . . . " and therefore the prompt classification model 204 may classify the prompt as having a summarization intent.

In certain embodiments, the predefined set of classifications may be a set of classifications that has been predefined for all user devices (e.g., computing system 104), all accounts, all IP addresses, all subscription levels, etc. In certain embodiments, the predefined set of classifications may be a set of classifications configured for and/or by a user device. In certain embodiments, the predefined set of classifications may be a set of classifications configured for and/or based on a user device, an account, a set of IP addresses, a subscription level, etc.

For example, in certain embodiments, a user may use a user device to configure and customize the prompt writing system 200. The user may determine the classifications to be included in the predefined set of classifications (e.g., via toggling selection elements on a user interface corresponding to a subset of defined classifications). In an example, the prompt writing system may be configured so that a prompt 202 may be received by the prompt writing system 200 along with a labeled classification, so that the classification model can be trained according to user provided classifications and corresponding classification labels and classify subsequent prompts based on predefined classifications configured by the user.

In certain embodiments, the prompt classification model 204 is a prompt intent classification model. The prompt intent classification model may determine that the intent of a prompt 202 it to perform a certain task, such as creating a presentation, creating a table, editing an image, editing a video, searching for a specific type of information, etc.

In certain embodiments, the prompt classification model 204 outputs a classification 206 determination based on a classification with the highest confidence score. In certain embodiments, the prompt classification model 204 outputs a classification 206 determination based on the classification having a confidence score above a set threshold.

In certain embodiments, the prompt classification model 204 outputs a fallback classification 206 when the prompt classification model 204 is unable to determine a classification with a high enough confidence. In certain embodiments, when the prompt classification model 204 is unable to determine the classification with a high enough confidence, the classification model may undergo training using the prompt 202 that was unable to be classified and/or other prompts. The training may include receiving a user-identified classification via a user interface of the user device.

In certain embodiments, the prompt classification model 204 is configured to output multiple classifications (e.g., two classifications, two prompt intent classifications, a prompt intent and a prompt category, etc.). For example, the output classifications may be the top two predicted classifications with the highest confidence scores.

In certain embodiments, the prompt classification model 204 is configured to output one or more category classifications for the prompt 202 that was input to the prompt classification model 204. The prompt 202 may cause the one or more prompt category classifications to be generated by the prompt classification model 204. For example, categories of prompts may be a technical prompt, a creative prompt, etc. Prompt intent classifications may be independent of prompt category classifications. For example, a first prompt may be a technical prompt and have a first image generation intent, or a second prompt may be a creative prompt and have an image generation intent.

In certain embodiments, the prompt writing system 200 includes more than one prompt classification model 204 (e.g., one or more prompt intent classification models, one or more prompt category models, etc.). In certain embodiments, the prompt classification model 204 to be used is based on the prompt 202, a user device the prompt 202 is received from, a user account the prompt 202 is associated with, an API used to submit the prompt 202, and/or the model that a generated output prompt (e.g., first output prompt 226, second output prompt 228) is to be used with, etc.

The prompt classification model 204 may be trained to output a determined classification 206 from the set of predefined classifications/classes. The prompt classification model 204 may be trained using a set of training data that is associated with one or more classifications. The prompt classification model 204 may be trained using supervised learning, semi-supervised learning, reinforcement learning, and/or unsupervised learning.

The prompt classification model 204 may be configured to transmit one or more predicted classifications 206 of the prompt 202 to the task specific prompt writing model 222, a data store (e.g., data store 302 in FIG. 3), and/or a general prompt writing model 224. The prompt classification model 204 may be configured to transmit the prompt 202 to the task specific prompt writing model 222, the data store, and/or the general prompt writing model 224. In certain embodiments, the prompt 202 is transmitted to the general prompt writing model 224 when a particular classification 206, or combination of classifications, is chosen by the prompt classification model 204. In certain embodiments, the prompt 202 is transmitted to the general prompt writing model 224 when a confidence of the prompt classification 206 by the prompt classification model 204 is not above a predefined threshold. In certain embodiments, the prompt 202 is transmitted to the general prompt writing model 224 when a classification is unable to be determined by the prompt classification model 204.

The general prompt writing model 224 may receive the prompt 202. The prompt 202 may be received from the prompt classification model 204. The general prompt writing model 224 may be a generative model (e.g., LLM; and in some examples can be the same LLM that the prompt will be provided as an input, such as the LLM implemented by the large language model application system 110). The general prompt writing model 224 may be configured to produce a second output prompt 228 based on the input prompt 202. In certain embodiments, the general prompt writing model 224 receives one classification 206 or multiple classifications from the prompt classification model(s) 204 and may use the one or more classifications 206 to generate the second output prompt 228.

The second output prompt 228 may include at least a portion of the same form, format, and/or content as the prompt 202. The second output prompt 228 may include at least some different form, format, and/or content as the prompt 202. The general prompt writing model 224 may transmit the second output prompt 228 to a device (e.g., a user device), a system, and/or another model (e.g., a generative model (e.g., LLM)).

In certain embodiments, once the general prompt writing model 224 has generated the second output prompt 228, the second output prompt 228 is transmitted to the prompt classification model 204 to determine if a different classification and/or a classification with a higher confidence can be determined so that the task specific prompt writing model 222 can be used.

In certain embodiments, a feedback loop may be implemented, for example, the first output prompt 226 or the second output prompt 228 (as the case maybe depending on the classification 206) may be transmitted to the prompt classification model 204 to cause a second classification to be generated using the output prompt (e.g., first output prompt 226 or the second output prompt 228). In certain embodiments, if the second classification is the same as the classification 206 determined using the prompt 202, the output prompt can be used (e.g., sent to a LLM and/or to a user device). In another example, the second output prompt 228 is input to the classification model 204 so that the second output prompt 228 can be classified. If the classification does not change (e.g., the classification of the second output prompt 228 is the same as the classification 206), the second output prompt 228 can be used (e.g., sent to a LLM and/or to a user device). Otherwise, the specific prompt writing model 222 may be called and given the second classification. Different options exist for calling the specific prompt writing model 222. One option is to use the second output prompt 228 as an input to the specific prompt writing model 222 (possibly with the second classification), resulting in a new output prompt that is then used (e.g., sent to a LLM and/or to a user device). In another option, the original prompt is input to the specific prompt writing model 222 possibly with the second classification, resulting in a new output prompt. Then both this new output prompt and the second output prompt 228 are used (e.g., e.g., combined and sent to a LLM and/or to a user device).

The task specific prompt writing model 222 may be configured to receive the prompt 202. The prompt 202 may be received from the prompt classification model 204. The task specific prompt writing model 222 may be configured to receive one or more classifications 206 of the prompt 202 from the prompt classification model 204(*s*).

The task specific prompt writing model 222 may obtain (e.g., select and/or receive) a template 208 from a set of one or more templates for use with generating the first output prompt 226. The template may be obtained by the task specific prompt writing model based on the one or more classification 206. The template 208 may include any number of template fields 210. The task specific prompt writing model 222 may configure template fields 210 included in a template 208. In certain embodiments, a portion of the template fields 210 in the template 208 are configurable by the task specific prompt writing model 222.

The template field may be a static template field or a dynamic template field. The dynamic template field, in combination with the prompt received by the task specific prompt writing model 222 may be used by the task specific prompt writing model 222 to generate one or more information elements to be include in the first output prompt 226. Each dynamic template field may include at least one of a postfix hint with keywords 212, a few-shot examples 214, a role descriptor 216, a change separator token 218, or other template 208 components to be completed using the prompt 202. The template fields 210 may be used to generate information elements to be included in the first output prompt 226. The information elements may be a piece of information having a particular format. For example, in the case of a text prompt, the info element can include text description, such as one or more words. In the case of an image prompt, the information element can include at least a portion of an image. In the case of an audio prompt, the information elements may include sounds. In the case of a video prompt, the information elements may include at least a frame.

Examples of template components that may be included in a template 208 to be used in generation of information elements to be included in a first output prompt 226 may be a postfix hint with keywords, a few-shot examples, a role descriptor, a change separator token.

As an example, the postfix hint with keywords 212 template field may be a field used to generate an information element. The information element may correspond to a determined topic keyword of the prompt 202.

As an example, the few-shot examples 214 may be a field used to generate an information element. The information element may include an example input and corresponding example output generated by the example input. The example input and/or output may have been received from a user interface of a user device, from previous input and/or output to and/or from a model, or from another source of inputs and corresponding outputs.

As an example, the role descriptor 216 may be a field used to generate an information element. The information element may correspond to an assumption to be made by a model (e.g., LLM) that may use the first output prompt 226.

As an example, the change separator token 218 may be a field used to generate an information element. The information element may correspond to how different information elements of the input prompt 202 should be concatenated.

An information element may be used in the generation of the first output prompt 226. The position of the information element in the first output prompt 226 may correspond to the position of the corresponding template field in the template 208.

The templates may be preconfigured templates. The preconfigured templates may have been received from a user device or based on template utility metrics. Template utility metrics may be determined based on a training process. The training process is described in further detail below (e.g., FIG. 8).

The template 208 may be obtained by a prompt writing model (e.g., the task specific prompt writing model 222) based on one or more classifications 206 generated by the one or more prompt classification models 204. The fields included in the obtained template 208 may be predefined depending on the one or more classifications 206.

Each template 208 may be associated with one or more classifications 206. In certain embodiments, the template(s) 208 may be obtained by the prompt writing model based on the one or more classifications 206. In certain embodiments, more than one template 208 may be obtained by the prompt writing model based on one or more classifications 206. In certain embodiments, the information elements to be included in the first output prompt 226 may be generated using more than one template 208. For example, the information elements may be generated using each template 208 and then combined with other information elements generated using other templates. For example, the templates may be merged before information elements are generated using the templates. In certain embodiments, when a prompt writing model uses multiple templates 208, multiple output prompts (e.g., first output prompt 226) are generated using the templates 208. The output prompts may be transmitted and used in a similar manner to the first output prompt 226. If multiple output prompts are generated using multiple templates 208, the output prompts may be filtered depending on criteria (e.g., criteria received from the user interface, quality metrics, etc.). Similarly, in certain embodiments, when multiple templates 208 are obtained (e.g., by a prompt writing model, by a data store, etc.) the templates may be filtered before being used by the prompt writing model. The templates may be filtered based on criteria (e.g., criteria received from the user interface, quality metrics, template priority attributes, etc.).

The task specific prompt writing model 222 may be configured to generate a first output prompt 226 based on the template 208 and the prompt 202. The task specific prompt writing model 222 may insert words and/or phrases from the prompt 202 into fields of the template 208 that are indicated by the template fields 210. In certain embodiments, the task specific prompt writing model 222 revises, summarizes, paraphrases, and/or generates text or other information included in the prompt 202 before inserting it into a template field. The task specific prompt writing model 222 may use the prompt 202 and the template 208 to insert information into each of the template components of the template 208. After the task specific prompt writing model 222 has generated a first output prompt 226 using the template 208 and the prompt 202 by inserting information into the template fields 210, the task specific prompt writing model 222 may transmit the first output prompt 226. The first output prompt 226 may include at least a portion of the same form, format, and/or content as the prompt 202. The first output prompt 226 may include at least some different form, format, and/or content as the prompt 202. The general prompt writing model 224 may transmit the first output prompt 226 to a user device, a system, and/or another model (e.g., generative model (e.g., LLM)).

In certain embodiments, the general prompt writing model 224 may be configured to use one (e.g., one template 208 of a set of templates) template 208 to generate the second output prompt 228 in a similar manner to which the task specific prompt writing model 222 may use a template 208.

Figure 3:
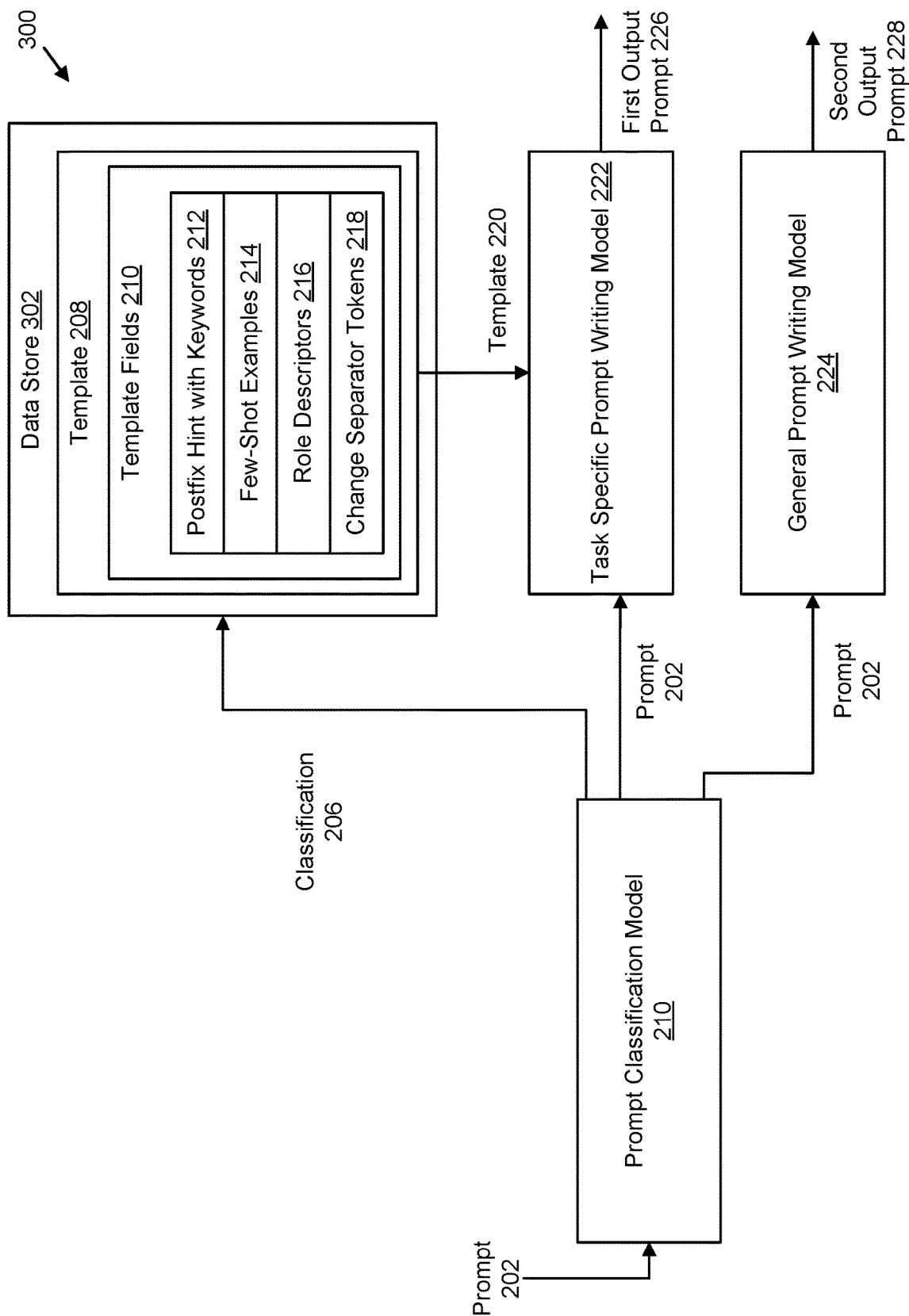
FIG. 3 illustrates an example of a second prompt writing system, according to embodiments of the present disclosure.

FIG. 3 illustrates an example of a second prompt writing system 300, according to embodiments of the present disclosure.

The second prompt writing system 300 may include a prompt classification model 204, a general prompt writing model 224, a task specific prompt writing model 222, and a data store 302 (e.g., to store a set of templates).

The prompt classification model 204 and the general prompt writing model 224 may be configured and function in the ways already described above with respect to FIG. 2.

The second prompt writing system 300 may be configured so that the prompt classification model 204 transmits the generated prompt classification(s) 206 to a data store 302 (e.g., instead of the task specific prompt writing model 222 as shown in FIG. 2). The data store 302 may be configured to select a template 208 from a set of templates based on the classification(s) 206 received from the prompt classification model 204. The template 208 may be similar to the templates already described above with respect to FIG. 2. The template 208 may be transmitted to a prompt writing model (e.g., the task specific prompt writing model 222).

Similar to FIG. 2, the prompt writing model (e.g., task specific prompt writing model 222) may use the template 208 and the prompt to generate an output prompt (e.g., first output prompt 226, second output prompt 228) in a similar manner as already described above.

Although FIGS. 2 and 3 illustrates that a prompt 202 is transmitted from the prompt classification model to a prompt writing model, in certain embodiments a representation of the prompt may be transmitted. For example, the representation of the prompt may be a feature vector, or other representation of the prompt.

Figure 4:
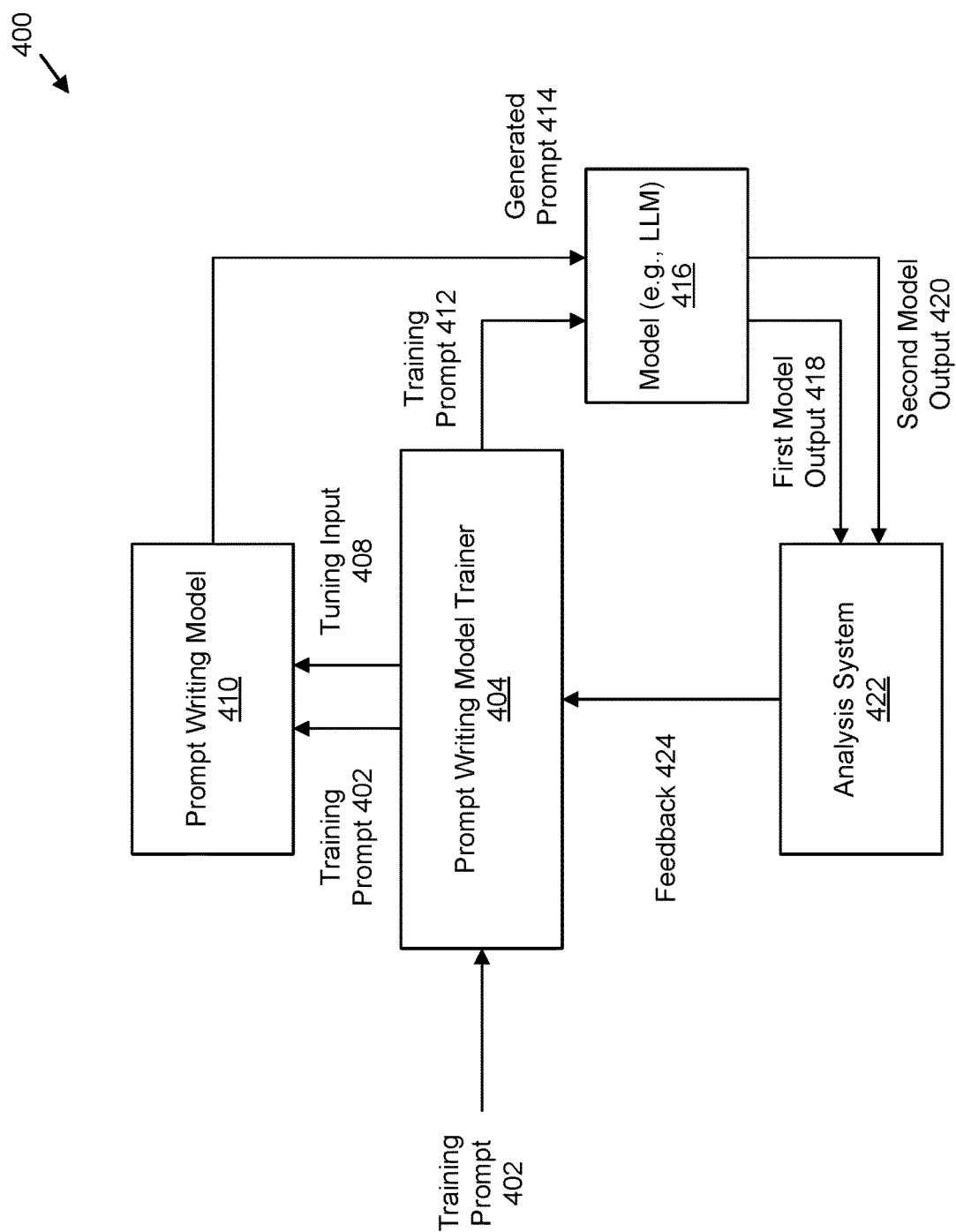
FIG. 4 illustrates an example of a system for training a prompt writing system, according to embodiments of the present disclosure.

FIG. 4 illustrates an example of a system for training a prompt writing system 400, according to embodiments of the present disclosure. The system for training a prompt writing system 400 may be configured to train a prompt writing model 410 by comparing a first model output 418 generated using a training prompt 402 to a second model output 420 generated using a prompt writing model 410 generated prompt 414.

The system for training the prompt writing system 400 may include a prompt writing model trainer 404, a prompt writing model 410, a model 416, and an analysis system 422.

The prompt writing model trainer 404 may be configured to receive a training prompt 402. The training prompt 402 may be part of a set of training prompts in a set of training data. The training prompt 402 may be a prompt entered during runtime and subsequently collected. The training prompt may be a prompt that was generated by using the prompt writing model during training and/or during runtime. Other training data (e.g., classifications of prompts, templates associated with prompts) may be obtained during training and/or during runtime. In certain embodiments, the prompt writing model 410 is further configured to receive one or more training classifiers. The one or more training classifiers may indicate a classification of the training prompt 402 or may indicate one or more confidence scores for one or more classification predictions for the training prompt 402.

The training classifier may be used to train a task specific prompt writing model 410. The training classifier may be used to train a general prompt writing model 410. The training classifier may be used to configure a template or set of templates.

The training prompts 402 and other training data may be used to train the prompt writing model 410 in a manner that is customized to a set of user accounts, region, etc. The training prompts 402 and/or the other training data may be received based on a specific set of user devices, IP addresses, user accounts, subscription level, etc. associated with the prompt writing model 410. For example, the prompt writing model 410 may be trained in a manner that is customized to the user and/or user devices intended to use the prompt writing model 410. The training prompts 402 and/or the other training data may be received to train the prompt writing model 410 for use by a specific set of user devices, IP addresses, user accounts, subscription levels, etc. For example, the prompt writing model 410 may be configured to be accessible to a specific set of user accounts.

The training prompts 402 and other training data may be obtained from a specific source (e.g., customer database data, customer usage data, etc.). The training prompts 402 and/or the other training data may be received based on an input received from a specific set of user devices, IP addresses, user accounts, etc. For example, the training prompts 402 and/or the other training data may have been prompts or other data received by a system (e.g., prompt writing system) used by a specific set of users (e.g., employees of company A). Thus, a single prompt writing model 410 (e.g., task specific prompt writing model) may be trained in a manner specific to the use cases of a specific user or system of the prompt writing model 410. In certain embodiments, an individual prompt writing model 410 (e.g., task specific prompt writing model) may be trained independently of other prompt writing models (e.g., other task specific prompt writing model(s) and/or general prompt writing model(s)). In certain embodiments, multiple prompt writing models 410 may be trained using the same set of training data. In certain embodiments, the training data used by each training instance may include different labels and cause the prompt writing models 410 trained using the different labels of the same training data (e.g., prompts) to be configured differently from one another.

The prompt writing model trainer 404 may be configured to transmit the received training prompt 402 to the prompt writing model 410. The prompt writing model trainer 404 may be configured to transmit the received training prompt 402 to the model 416 (e.g., LLM).

The prompt writing model 410 may be a general prompt writing model 410 or a task specific prompt writing model 410. The prompt writing model 410 may generate a prompt 414. The prompt writing model 410 may output the generated prompt 414 and transmit the generated prompt 414 to the model 416.

The model 416 may be configured to generate model output based on a received prompt. The model 416 may be an LLM or any other type of model capable of generating an output based on a prompt. The model 416 may generate a first model output 418 based on the training prompt 412 received from the prompt writing model trainer 404. The first model output 418 may be transmitted from the model to the analysis system 422. The model 416 may use the generated prompt 414 received from the prompt writing model 410 to generate a second model output 420. The second model output 420 may be transmitted from the model 416 to the analysis system 422.

The analysis system 422 may receive the first model output 418 and the second model output 420 from the model. The analysis system 422 may determine which of the first model output 418 and the second model output 420 have a greater quality. Quality of the model outputs may be measured using quality metrics. The quality metrics may be determined based at least on determining a number of keywords used in the respective output, determining a number of key phrases used in the respective output, determining a length of the respective output, determining an order of key words used in the respective output, determining punctuation used in the respective output, determining which keywords were used in the respective output, and/or determining which key phrases were used in the respective output. The quality metrics may be determined based at least on an accuracy score of the respective output and/or a performance metric of the respective output. The quality accuracy may be determined based on an F1-Score. The performance metric may be based on error rate, precision, recall, true positives, false positives, true negatives, false negatives, BiLingual Evaluation Understudy (BLEU) metrics, and/or Recall-Oriented Understudy for Gisting Evaluation (ROUGE) metrics. The quality metrics may be determined for the first model output 418 and the second model output 420 before they are then compared to determine which model output is associated with the greater quality metric.

In certain embodiments, the analysis system 422 presents the first model output 418 and the second model output 420 to a user interface of a user device. The user interface may be capable of allowing a user to select whether the first model output 418 or the second model output 420 is of greater quality. The user may select the model output with greater quality by indicating with a clicking action, ranking action, value assignment action, and/or copying action, etc.

The analysis system 422 may transmit feedback 424 to the prompt writing model trainer 404 based on the determination regarding which received input to the analysis system 422 was of greater quality. The feedback 424 may indicate: which model output was determined to have a greater quality, whether the second model output 420 was determined to have the greater quality, and/or one or more characteristics (e.g., form, format, content) of the model output that was determined to have.

The feedback 424 and/or determined quality metrics of a template, prompt, model output, etc. may be stored to be used as training data (e.g., for training the prompt writing model 410, for training a model 416, etc.).

The prompt writing model 410 may be configured to receive the feedback 424 from the analysis system 422 and cause the prompt writing model 410 to be further configured/tuned. The prompt writing model 410 training may further configure/tune the prompt writing model 410 by transmitting tuning input 408 to the prompt writing model 410. The tuning input 408 may be adjustments to hyperparameters, hyperparameter values, a reward indication, a punishment indication, etc. Responsive to the tuning input 408, the prompt writing model 410 may be configured differently than when the prompt writing model 410 output the generated prompt using the training prompt. In certain embodiments, after the prompt writing model 410 is further configured using the tuning input 408, the prompt writing model 410 receives the same training prompt 402 or a new training prompt so that the prompt writing model 410 may be further configured according to further feedback from the output analysis system 422.

Figure 5:
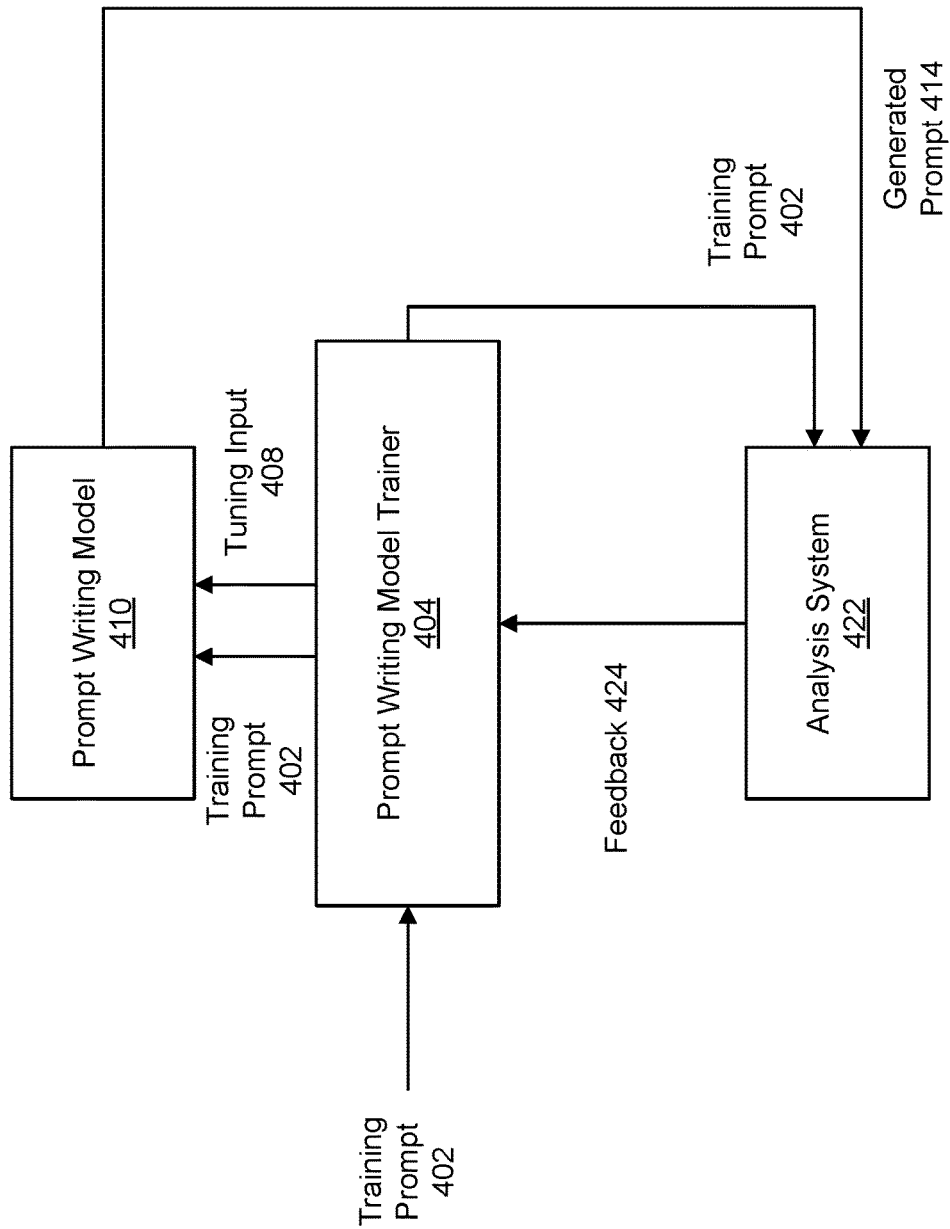
FIG. 5 illustrates an example of a second system for training a prompt writing system, according to embodiments of the present disclosure.

FIG. 5 illustrates an example of a second system for training a prompt writing system 500, according to embodiments of the present disclosure. The second system for training a prompt writing system 500 may be configured to train a prompt writing model 410 by comparing a prompt writing model 410 generated prompt 414 with a training prompt 412.

The second system for training a prompt writing system 500 may be similar, in some respects to the prompt writing system in FIG. 4. The second system for training a prompt writing system 500 may include a prompt writing model trainer 404, a prompt writing model 410, and an analysis system 422.

The prompt writing model 410 may be configured in a similar fashion as already described above with respect to FIG. 4.

The prompt writing model trainer 404 may be configured to receive a training prompt 402. The training prompt 402 may be part of a set of training prompts in training data. The training prompt 402 may be a prompt entered during runtime. In certain embodiments, the prompt writing model trainer 404 is further configured to receive one or more training classifiers. The one or more training classifiers may indicate a classification of the training prompt 402 or may indicate one or more confidence scores for one or more classification predictions for the training prompt 402. The training classifier may be used to train a task specific prompt writing model 410. The training classifier may be used to train a general prompt writing model 410.

The prompt writing model trainer 404 may be configured to transmit the training prompt 402 to the analysis system 422. The prompt writing model trainer 404 may be configured to transmit the training prompt 402 to the prompt writing model 410. The prompt writing model trainer 404 may be configured to transmit a classifier of the training prompt 402 to the prompt writing model 410.

The prompt writing model 410 may be a general prompt writing model 410 or a task specific prompt writing model 410. The prompt writing model 410 may generate a prompt 414. The prompt writing model 410 may output the generated prompt 414 and transmit the generated prompt 414 to the analysis system 422.

The analysis system 422 may receive the training prompt 402 from the prompt writing model trainer 404 and receive the generated prompt 414 from the prompt writing model 410. In certain embodiments, the training prompt 402 is not transmitted to the analysis system 422. In certain embodiments, the classification of the training prompt 402 is transmitted to the analysis system 422 (e.g., by the prompt writing model 410, by the prompt writing model trainer 404, from the same source as the training prompt 402 was received by the prompt writing model trainer 404 from).

The analysis system 422 may determine which of the training prompt 402 and the generated prompt 414 have a greater quality. Quality of the prompts may be measured using quality metrics. The quality metrics may be determined based at least on determining a number of keywords used in the respective prompt, determining a number of key phrases used in the respective prompt, determining a length of the respective prompt, determining an order of key words used in the respective prompt, determining punctuation used in the respective prompt, determining which keywords were used in the respective prompt, and/or determining which key phrases were used in the respective prompt. The quality metrics may be determined for the training prompt 402 and the generated prompt 414 before they are then compared to determine which prompt is associated with the greater quality metric.

In certain embodiments, the analysis system 422 presents the training prompt 402 and the generated prompt 414 to a user interface of a user device. The user interface may be capable of allowing a user to select whether the training prompt 402 or the generated prompt 414 is of greater quality. The user may select the prompt with greater quality by indicating with a clicking action, ranking action, value assignment action, and/or copying action.

The analysis system 422 may transmit feedback 424 the prompt writing model trainer 404 based on the determination regarding which received prompt was of greater quality. The feedback 424 may indicate: which model prompt was determined to have a greater quality, whether the generated prompt 414 was determined to have the greater quality, and/or one or more characteristics (e.g., form, format, content) the generated prompt 414 output was determined to have.

In certain embodiments, the analysis system 422 receives a single prompt (e.g., the generated prompt 414) and analyzes the prompt to determine the quality metrics of the prompt. The prompt may be evaluated using any of the above methods. The prompt metric results may then be used to provide feedback 424 to the prompt writing model trainer 404.

The prompt writing model 410 may be configured to receive the feedback 424 from the analysis system 422 and cause the prompt writing model 410 to be further configured/tuned. The prompt writing model trainer 404 may further configure/tune the prompt writing model 410 by transmitting tuning input 408 to the prompt writing model 410. The tuning input 408 may be adjustments to hyperparameters, hyperparameter values, a reward indication, a punishment indication, etc. Responsive to the tuning input 408, the prompt writing model 410 may be configured differently than when the prompt writing model 410 output the generated prompt using the training prompt 402. In certain embodiments, after the prompt writing model 410 is further configured using the tuning input 408, the prompt writing model 410 received the same training prompt 402 or a new training prompt so that the prompt writing model 410 may be further configured according to further feedback from the output analysis system 422.

Although FIGS. 4 and 5 illustrates that prompts (e.g., training prompt 412, generated prompt 414) and model outputs (e.g., first model output 418, second model output 420) are transmitted, in certain embodiments a representation of the prompt(s) and/or model output(s) may be transmitted. For example, the representation of a prompt may be a feature vector, or other representation of the prompt.

Figure 6:
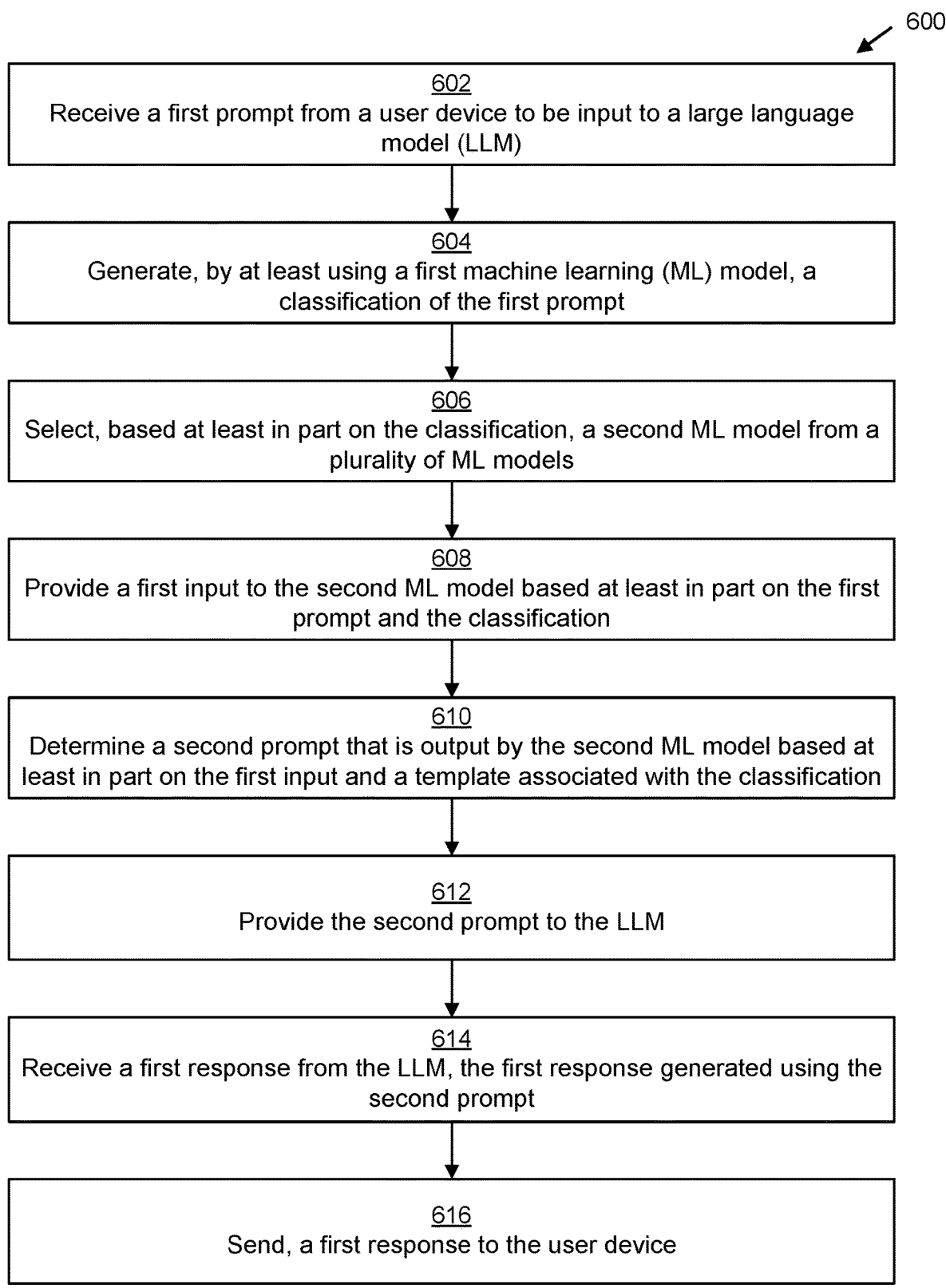
FIG. 6 illustrates an example of a process for using a prompt improvement system, according to embodiments of the present disclosure.
Figure 7:
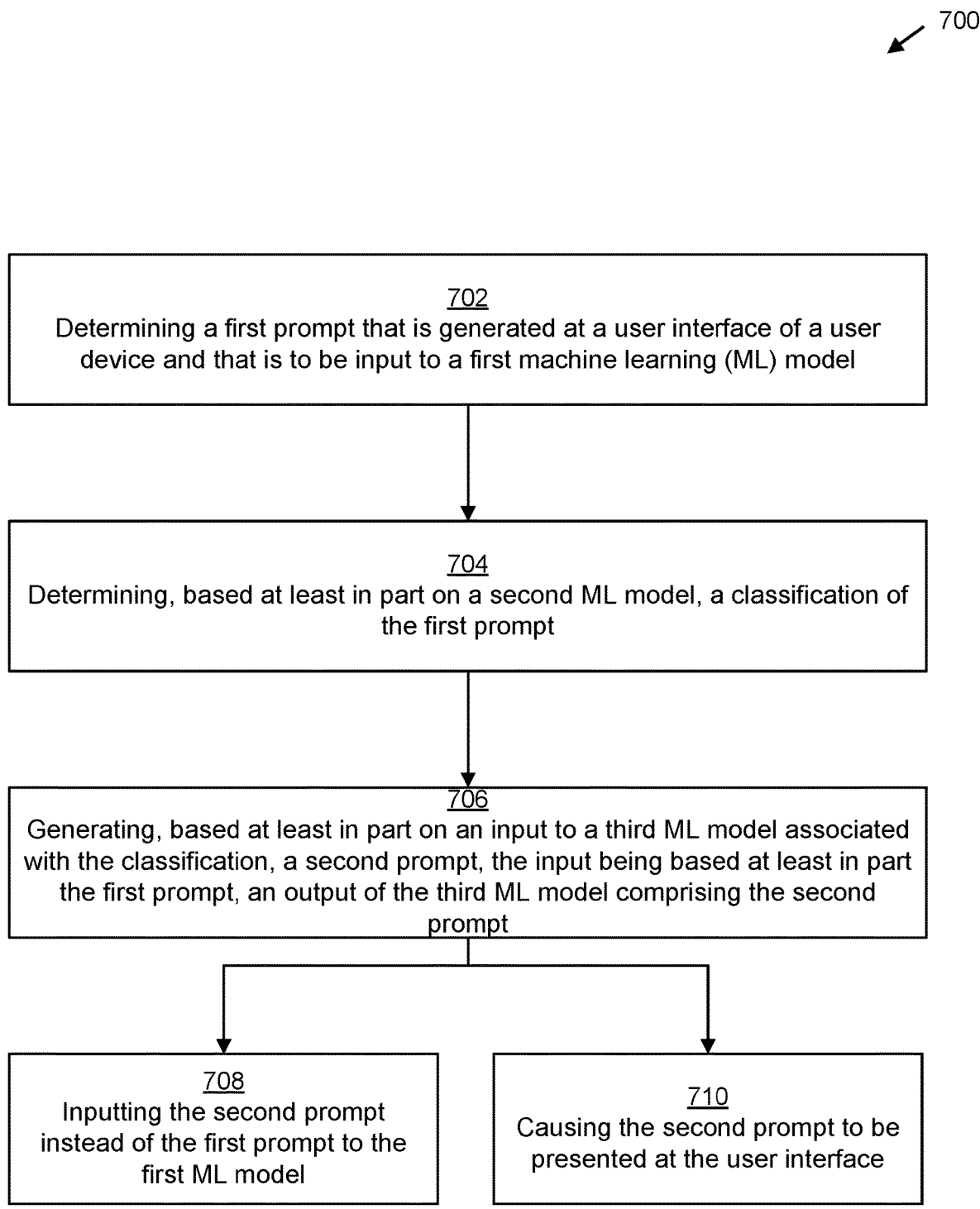
FIG. 7 illustrates a second example of a process for using a prompt improvement system, according to embodiments of the present disclosure.
Figure 8:
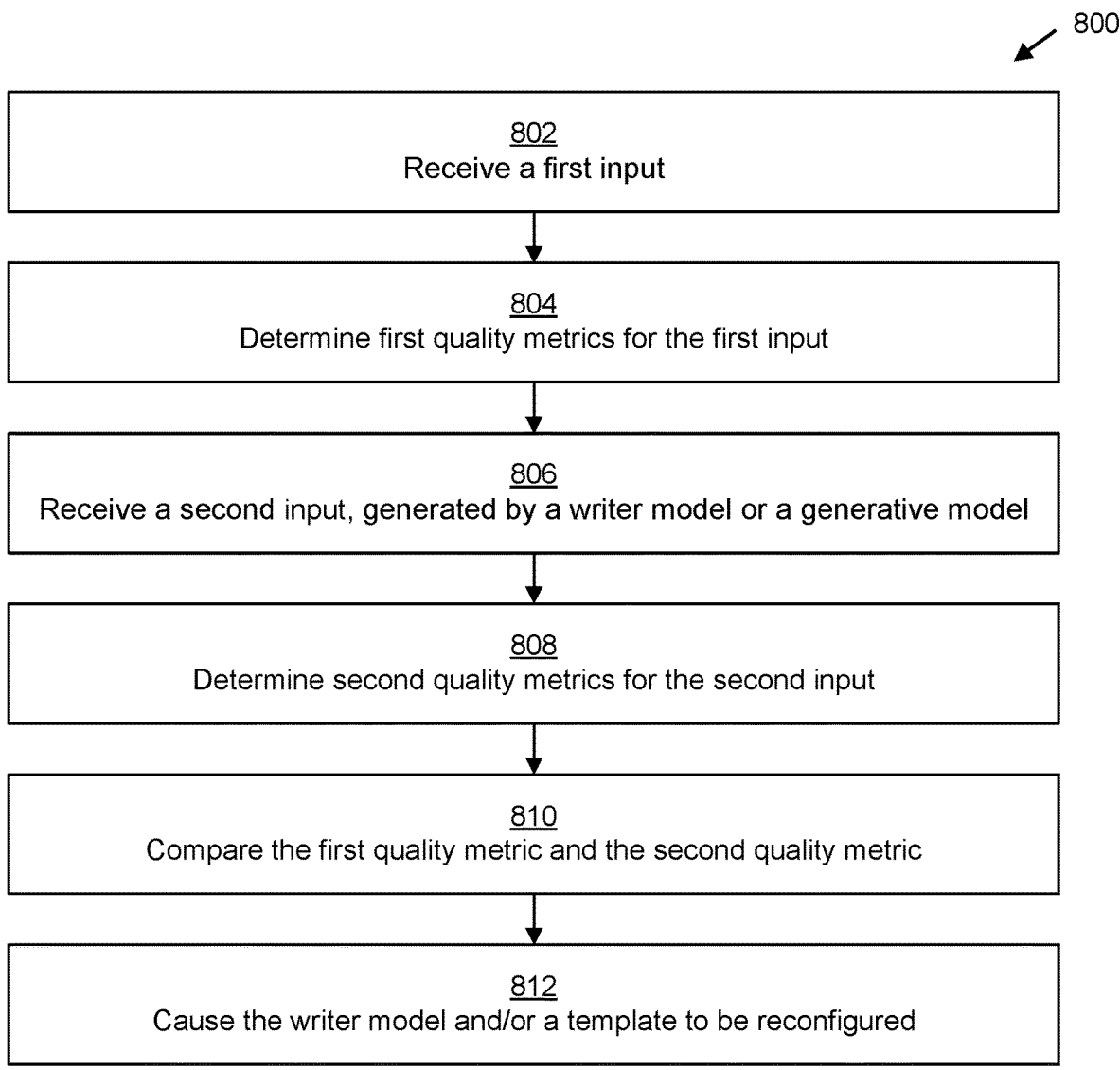
FIG. 8 illustrates an example of a process for training a prompt writer model of a prompt improvement system.

FIGS. 6-8 illustrate processes that may be performed by embodiments described herein. Each process is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

FIG. 6 illustrates an example of a process 600 for using a prompt improvement system, according to embodiments of the present disclosure.

At 602, a first prompt may be received from a user device. The first prompt may be received from the user device with an indication that it is be input to a LLM. Further, an indication of which LLM the user device has selected the first prompt to be input into may be received from the user device. The first prompt may be transmitted from the user device using a plugin and/or an Application Programming Interface (API).

At 604, a first ML model may be used to generate a classification of the first prompt. In certain embodiments, the first ML model generates more than one classification. In certain embodiments, the first ML model generates one or more confidence scores. The classification of the first prompt may classify the form, format, and/or content of the first prompt.

At 606, a second ML model may be selected from a plurality of ML models. The second ML model may be selected based at least in part on the classification generated by the first ML model. The second ML model may be configured to output first LLM prompts based at least in part on a set of templates. The plurality of ML models may further comprise a third ML model. The third ML model may be associated with a different classification than the second ML model. In certain embodiments, the third ML model is selected instead of the second ML model because the classification generated by the first ML model is a classification that is associated with the third ML model. The third ML model may be configured to output second LLM prompts independently of any template in the set of templates.

The set of templates may include one or more templates that correspond to a classification or combination of classifications. Based on the classification and/or the second ML model, the template may be used. The set of templates may be stored in a data store. The data store may be capable of receiving a query including a classification, associated with the classification, and/or associated with the second ML model that is capable of causing a template to be selected and transmitted to the second ML model.

The template may include fields defined by the template. The fields may be static fields and/or dynamic fields. The static fields may be capable of being used to generate output from the second ML model. The dynamic fields may be capable of being altered with information elements to generate output from the second ML model. The dynamic template fields, in combination with the first prompt may be used by the second ML model to generate one or more information elements to be include in the second prompt. The information elements may be generated based on the second ML model and the first prompt. In certain embodiments, each information element may include at least a portion of the first prompt and/or may include data generated using the first prompt and the second ML model. The second ML model may be used in combination with the template to generate a second prompt. The second prompt may include static fields from the template and dynamic fields from the template that have been altered with information elements.

At 608, a first input may be provided to the second ML model. The first input may be based at least in part on the first prompt and/or the template associated with the classification.

In certain embodiments, the template associated with the classification may be selected using the second ML model and/or the classification from the set of templates. In certain embodiments, the second ML model selects the template using the classification.

At 610, a second prompt may be output by the second ML model. The output may be based at least in part on the first input and the template associated with the classification. The second prompt may include at least a portion of the form, format, and/or content of the first prompt. The second prompt may be generated based on the form, format, and/or content of the first prompt. The second prompt may include different form, format, and/or content compared to the first prompt. The second prompt may include information elements generated by the second ML model.

At 612, the second prompt may be provided to the LLM. The second prompt may be provided to the LLM by the second ML model.

At 614, a first response may be received from the LLM. The first response may be generated using the second prompt. The response may include different form, format, and/or content than the first prompt and/or second prompt. The response may be responsive to the content of the first and/or second prompt.

At 616, the first response may be sent to the user device.

In certain embodiments, the first prompt and/or the second prompt is transmitted to the user device. In certain embodiments, the first prompt provided to the LLM causes a second response to be received and sent to the user device. In certain embodiments, after the first prompt is provided to the LLM, the LLM causes a response (e.g., LLM output) to be output and transmitted to the second ML model. The second ML model may send the received output from the LLM to the user device.

In certain embodiments, a third prompt is received from the user device to be input to the LLM. A second classification, a classification of the third prompt may be generated by the first ML model. The second classification may be different than the first classification. The third ML model may be selected based at least in part on the second classification. A second input may be provided to the third ML model. The second input may be based at least in part on the third prompt and/or the second classification. The third ML model may be a generative model. In certain embodiments, the third ML model correspond to a classification with a confidence score below a predetermined value. In certain embodiments, the third ML model corresponds to a particular classification.

The third ML model may determine and output a fourth prompt. The fourth prompt determined by the third ML model may be determined based at least in part on the second input. The fourth prompt may be provided to the LLM.

Some or all of the process 600 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Process 600 may be performed by the system 100, system 200, and/or system 300.

FIG. 7 illustrates a second example of a process 700 for using a prompt improvement system, according to embodiments of the present disclosure.

At 702, a first prompt may be determined. The first prompt may be generated at a user device. The first prompt may be generated at a user interface of the user device. The first prompt may be associated with an indication that the first prompt is to be input to a first ML model. The first ML model may be a generative ML model (e.g., LLM) or another type of ML model. The first prompt may be characterized by a form, format, and/or content.

At 704, a classification of the first prompt may be determined. The classification may be determined based at least in part on a second ML model. The second ML model may be a classification model. The classification may be a single classification or combination of classifications. In certain embodiments, a confidence score is also determined using the second ML model. The classification may represent one or more characteristics about the first prompt.

For example, the classification may represent that the first prompt is determined to have a summarization intention, a mathematical reasoning intention, a classification intention, etc. The classification may represent the content the first prompt includes (e.g., fictional, news, non-fiction, romantic, etc.). The classification may represent the format of the first prompt (e.g., list, formula, paragraph, short form, formal, etc.). The classification may represent the form of the first prompt (e.g., text, image, multimodal, sound, etc.).

At 706, based at least in part on the first prompt an input to a third ML model may be generated.

In certain embodiments, the third ML model is selected based at least in part on the classification. The third ML model may be selected from a plurality of ML models. Each of the plurality of ML models may be associated any number of classifications. The third ML model may be associated with the classification. The third ML model may be configured to output second prompts based at least in part on a set of templates (e.g., a task-specific ML model). Input to the third ML model may be based at least in part on the classification.

The output of the third ML model may be based at least in part on a template associated with the classification.

The template may be received from a data store. The data store may include the set of templates. In certain embodiments, the template may be transmitted by the data store responsive to receiving a classification from the third ML model. In certain embodiments, the template may be transmitted from the data store responsive to receiving a classification from the second ML model.

The template may include fields. The template fields may be static template fields or dynamic template fields. The fields may have information elements inserted into them, by the third ML model. The third ML model may be configured to generate information elements to insert into a dynamic template field. The static fields in combination with the information elements inserted into the dynamic fields may produce a second prompt.

The plurality of ML models may include a fourth ML model. The fourth ML model may be associated with a different classification than the third ML model. The third ML model and the fourth ML model may each be configured to output a second prompt. The fourth ML model may output a second prompt independently of any template in the set of templates. In certain embodiments, the fourth ML model is selected. The fourth ML model may be selected based at least in part on the classification.

The input may be based at least in part on the first prompt, a classification of the first prompt, and/or a first ML model. The third ML model may be associated with the classification. The third ML model may have been selected based on the classification.

A second prompt may be generated using the third ML model and the input. The input may include a classification, and/or a template. The third ML model may be a generative ML model or may be a task specific ML model.

The second prompt may include at least a portion of the form, format, and/or content of the first prompt. The second prompt may be generated based on the form, format, and/or content of the first prompt. The second prompt may include different form, format, and/or content compared to the first prompt. The second prompt may include information elements generated by the second ML model. The second prompt may be generated using the fields defined by the template and the information elements.

The second prompt may be used to perform 708 and/or 710.

At 708, the second prompt may be input to the first ML model. The second prompt may be input to the first ML model instead of the first prompt.

In certain embodiments, the first prompt and the second prompt are input the first ML model. In certain embodiments, the first prompt and second prompt are sequentially input to the first ML model.

At 710, the second prompt may be presented at the user interface. In certain embodiments, the first prompt and the second prompt are each presented at the user interface.

In certain embodiments, as described above, the second prompt may be classified (e.g., like at step S704) and used to generate a third prompt. In certain embodiments, upon the second prompt being generated at step S706, the second prompt is evaluated before performing steps S708 and/or S710. The second prompt may be evaluated independently of the first prompt or by comparing the second prompt or characteristics of the second prompt to the first prompt or characteristics of the first prompt.

Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Process 700 may be performed by the system 100, system 200, and/or system 300.

FIG. 8 illustrates an example of a process 800 for training a prompt writer model of a prompt improvement system.

The prompt writer model may be trained for a specific set of users, devices, etc. The prompt writer model may be trained based on configuration input received from a user device. The configuration input may be received from a user interface of the user device.

At 802, a first input may be received. The first input may be received by an analysis system. The first input may include a first prompt or a representation of the first prompt (e.g., feature vector, or some other transformation of the prompt). The first input may include a first output that was generated using the first prompt or a representation of the first output (e.g., feature vector). The first prompt may have been generated using a first template.

The first prompt may be a prompt that was used to generate a second prompt. The first output may be output that was generated using at least the first prompt.

At 804, a first quality metric for the first input may be determined. The first quality metric may be determined by performing at least one of: determining a number of keywords used in the first input, determining a number of key phrases used in the first input, determining a length of the first input, determining an order of key words used in the first input, determining punctuation used in the first input, determining which keywords were used in the first input, and/or determining which key phrases were used in the first input. The first quality metric may be determined using first user input. The first user input may indicate a label to be associated with the first input. The label may indicate quality. The label may be binary or be based on a scale. The label may be based on multiple sub labels. The first user input may indicate quality various user interface elements, such as dials, sliders, radio buttons, checkboxes, etc.

At 806, a second input may be received. The second input may be received by the analysis system. The second input may include a second prompt or a representation of the second prompt (e.g., feature vectors). The second input may include a second output that was generated using the second prompt or a representation of the second prompt (e.g., feature vector). The second prompt may have been generates using a second template.

The second prompt may be a prompt that was generated based at least in part on the first prompt. The second output may be output generated based at least in part on the second prompt that was generated using the first prompt.

At 808, a second quality metric for the second input may be determined. The second quality metric may be determined by performing at least one of: determining a number of keywords used in the second input, determining a number of key phrases used in the second input, determining a length of the second input, determining an order of key words used in the second input, determining punctuation used in the second input, determining which keywords were used in the second input, and/or determining which key phrases were used in the second input. The second quality metric may be determined using second user input. The second user input may indicate a label to be associated with the second input. The label may indicate quality. The label may be binary or be based on a scale. The label may be based on sub labels. The second user input may indicate quality various user interface elements, such as dials, sliders, radio buttons, checkboxes, etc.

At 810, the first quality metric and the second quality metric may be compared.

At 812, based on the comparison at 810, a writer model and/or a template may be caused to be reconfigured. The writer model may be a task specific writer model or a may be a generic writer model. The writer model may be a generative ML model.

A writer model may be caused to be reconfigured if the first quality metric is greater than the second quality metric. In certain embodiments, the writer model may be caused to be reconfigured if the first quality metric is greater than the second quality metric by a predetermined amount (e.g., a constant value, a constant multiple, etc.). In certain embodiments, the writer model is caused to be reconfigured if the first quality metric is greater than the second quality metric more than a predefined number of times (e.g., based on multiple user input).

Reconfiguring the writer model may include updating hyperparameters of the writer model, updating hyperparameter values of the writer model, etc.

In certain embodiments, the first input and the second input are not compared. In certain embodiments, the writer model is reconfigured based a single quality metric (e.g., the first quality metric or the second quality metric).

In certain embodiments, a template used to generate a prompt that was evaluated with a quality metric may be reconfigured at 812. Reconfiguring a template may include adding, removing, and/or moving fields of the template. The fields added, removed, and/or moved may include static fields and/or dynamic fields. For example, a "number of classes" field may be added or removed. As a further example, a "number of classes" field may be changed to a "query type" field. The fields added, removed, and/or moved may include a type of dynamic field (e.g., few-shot example)).

Some or all of the process 800 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Process 800 may be performed by the system 400 and/or system 500.

Figure 9:
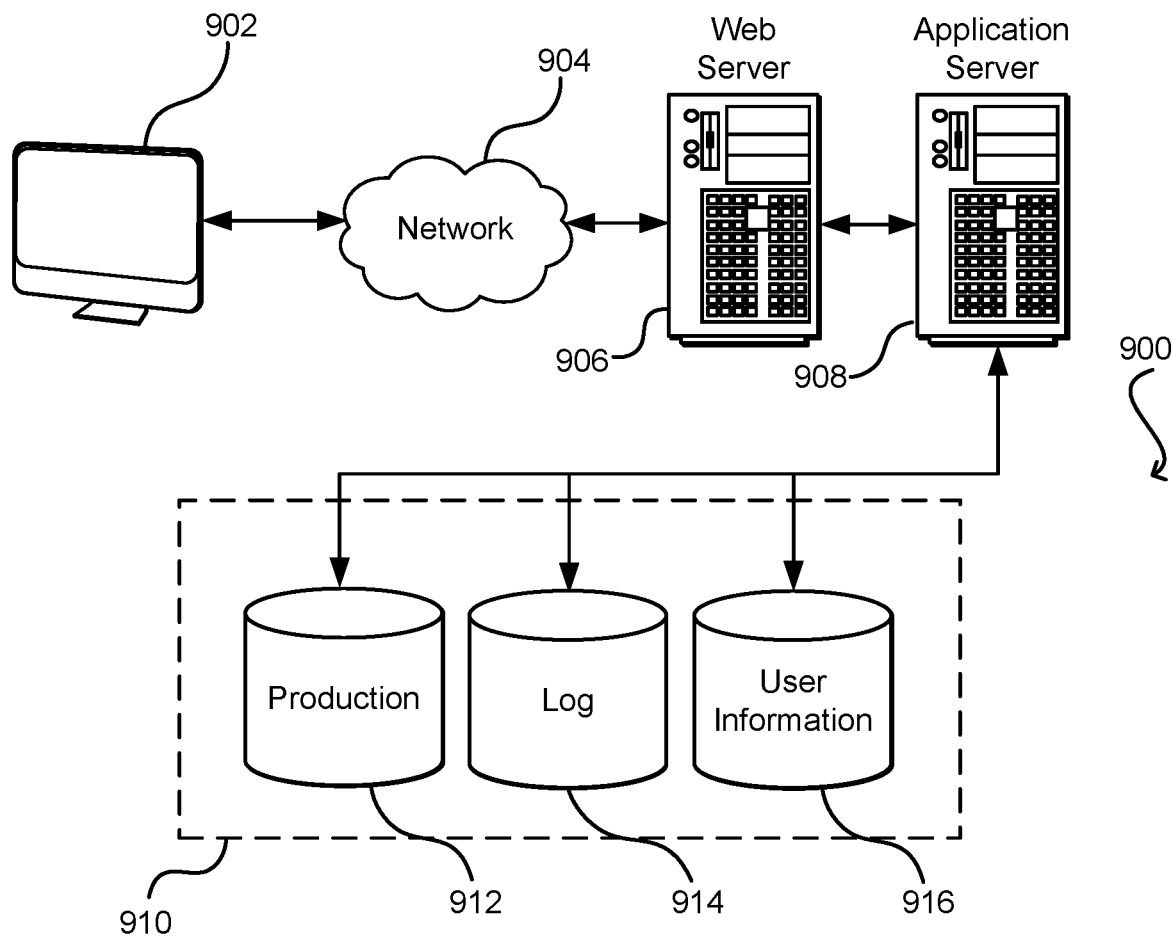
FIG. 9 illustrates an example of an architecture of a computer, according to embodiments of the present disclosure.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the example environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   one or more storage media storing instructions; and
   one or more processors configured to execute the instructions to cause the system to: receive a first prompt from a user device to be input to a large language model (LLM);
   generate, by at least using a first machine learning (ML) model, a classification of the first prompt;
   select, based at least in part on the classification, a second ML model from a plurality of ML models, the second ML model configured to output first LLM prompts based at least in part on a set of templates, the plurality of ML models comprising a third ML model associated with a different classification and configured to output second LLM prompts independently of any template in the set of templates;
   provide a first input to the second ML model based at least in part on the first prompt and the classification;
   determine a second prompt that is output by the second ML model based at least in part on the first input and a template associated with the classification;
   provide the second prompt to the LLM;
   receive a first response from the LLM, the first response generated using the second prompt; and
   send, the first response to the user device.

2. The system of claim 1, wherein the execution of the instructions further causes the system to:
   receive a third prompt from the user device to be input to the LLM;
   generate a second classification of the third prompt by at least using the first ML model;
   select the third ML model based at least in part on the second classification;
   provide a second input to the third ML model based at least in part on the third prompt and the second classification;
   determine a fourth prompt that is output by the third ML model based at least in part on the second input; and
   provide the fourth prompt to the LLM.

3. The system of claim 1, wherein the execution of the instructions further causes the system to:
   receive, by the second ML model, the classification;
   select, using the second ML model and the classification, the template associated with the classification from the set of templates;
   generate, by the second ML model, information elements based at least on the first prompt, the information elements corresponding to fields defined by the template; and
   generate the second prompt using the fields defined by the template and the information elements.

4. The system of claim 1, wherein the execution of the instructions further causes the system to:
   transmit a query to a data store, the query including the classification, the data store storing the set of templates;
   receive, by the second ML model, the template associated with the classification from the data store;
   receive, by the second ML model, the first prompt; and
   generate, by the second ML model, information elements based at least on the first prompt, the information elements corresponding to fields defined by the template, wherein the second prompt includes the information elements.

5. A computer-implemented method, comprising:
   receiving a first prompt from a user device to be input to a large language model (LLM);
   generating, by at least using a first machine learning (ML) model, a classification of the first prompt;
   selecting, based at least in part on the classification, a second ML model from a plurality of ML models, the second ML model configured to output first LLM prompts based at least in part on a set of templates, the plurality of ML models comprising a third ML model associated with a different classification and configured to output second LLM prompts independently of any template in the set of templates;
   providing a first input to the second ML model based at least in part on the first prompt and the classification;
   determining a second prompt that is output by the second ML model based at least in part on the first input and a template associated with the classification;

providing the second prompt to the LLM;
receiving a first response from the LLM, the first response generated using the second prompt; and
sending, the first response to the user device.

6. The computer-implemented method of claim 5, wherein the template is associated with the classification.

7. The computer-implemented method of claim 5, wherein determining the second prompt that is output by the second ML model further comprises:
receiving, by the second ML model, the classification;
selecting, using the second ML model and the classification, the template associated with the classification from the set of templates; and
generating, by the second ML model, information elements based at least on the first prompt, the information elements corresponding to fields defined by the template, wherein the second prompt includes the information elements.

8. The computer-implemented method of claim 5, wherein determining the second prompt that is output by the second ML model further comprises:
transmitting a query to a data store, the query including the classification, the data store storing the set of templates;
receiving, by the second ML model, the template associated with the classification from the data store;
receiving, by the second ML model, the first prompt; and
generating, by the second ML model, information elements based at least on the first prompt, the information elements corresponding to fields defined by the template; wherein the second prompt includes the information elements.

9. The computer-implemented method of claim 5, wherein the second ML model is trained according to a training procedure, the training procedure comprising:
receiving a third prompt;
generating, by using the second ML model based at least in part on the third prompt, a fourth prompt;
receiving an indication that one of: (i) the third prompt or (ii) the fourth prompt were selected to be used as input to the LLM; and
updating parameters of the second ML model based at least in part on the indication.

10. The computer-implemented method of claim 5, wherein the second ML model is trained according to a training procedure, the training procedure comprising:
receiving a third prompt;
generating, by using the second ML model based at least in part on the third prompt, a fourth prompt;
inputting the third prompt to the LLM;
inputting the fourth prompt to the LLM;
receiving a first output from the LLM corresponding to the third prompt;
receiving a second output from the LLM corresponding to the fourth prompt;
receiving an indication that one of: (i) the first output or (ii) the second output was of greater quality; and
updating parameters of the second ML model based at least in part on the indication.

11. One or more non-transitory computer-readable storage media storing instructions that, upon execution executable by one or more processors of a system, cause the system to perform operations comprising:
receiving a first prompt from a user device to be input to a large language model (LLM);
generating, by at least using a first machine learning (ML) model, a classification of the first prompt;
selecting, based at least in part on the classification, a second ML model from a plurality of ML models, the second ML model configured to output first LLM prompts based at least in part on a set of templates, the plurality of ML models comprising a third ML model associated with a different classification and configured to output second LLM prompts independently of any template in the set of templates;
providing a first input to the second ML model based at least in part on the first prompt and the classification;
determining a second prompt that is output by the second ML model based at least in part on the first input and a template associated with the classification;
providing the second prompt to the LLM;
receiving a first response from the LLM, the first response generated using the second prompt; and
sending, the first response to the user device.

12. The non-transitory computer-readable storage medium of claim 11, wherein execution of the instructions further causes the system to perform training operations comprising:
receiving a third prompt;
generating, by using the second ML model based at least in part on the third prompt, a fourth prompt;
inputting the fourth prompt to the LLM;
receiving a second output from the LLM corresponding to the fourth prompt;
receiving an indication of a quality of the second output; and
updating parameters of the second ML model based at least in part on the indication.

13. The non-transitory computer-readable storage medium of claim 12, wherein the indication of the quality is determined by performing at least one of: determining a number of keywords used in the second output, determining a number of key phrases used in the second output, determining a length of the second output, determining an order of key words used in the second output, determining punctuation used in the second output, determining which keywords were used in the second output, determining which key phrases were used in the second output, determining an accuracy of the second prompt, or determining a performance metric of the second prompt.

14. The non-transitory computer-readable storage medium of claim 12, wherein receiving the indication further comprises:
receiving the indication from an analysis system configured to indicate which one of the third prompt or the fourth prompt has a higher prompt value metric.

15. The non-transitory computer-readable storage medium of claim 12, wherein the indication of the quality is determined by at least receiving user input indicating a label to be associated with the second output, the label indicating the quality.

16. The non-transitory computer-readable storage medium of claim 11, wherein execution of the instructions further causes the system to perform additional operations comprising:
wherein the template is associated with the classification.

17. The non-transitory computer-readable storage medium of claim 11, wherein the instructions are part of a plugin for program code of an application hosted by the system, and wherein the application is configured by the plugin to replace the first prompt with the second prompt as an input to the LLM.

18. The non-transitory computer-readable storage medium of claim 17, wherein the plugin further configures the application to present the second prompt at a user interface of the user device.

\* \* \* \* \*